form

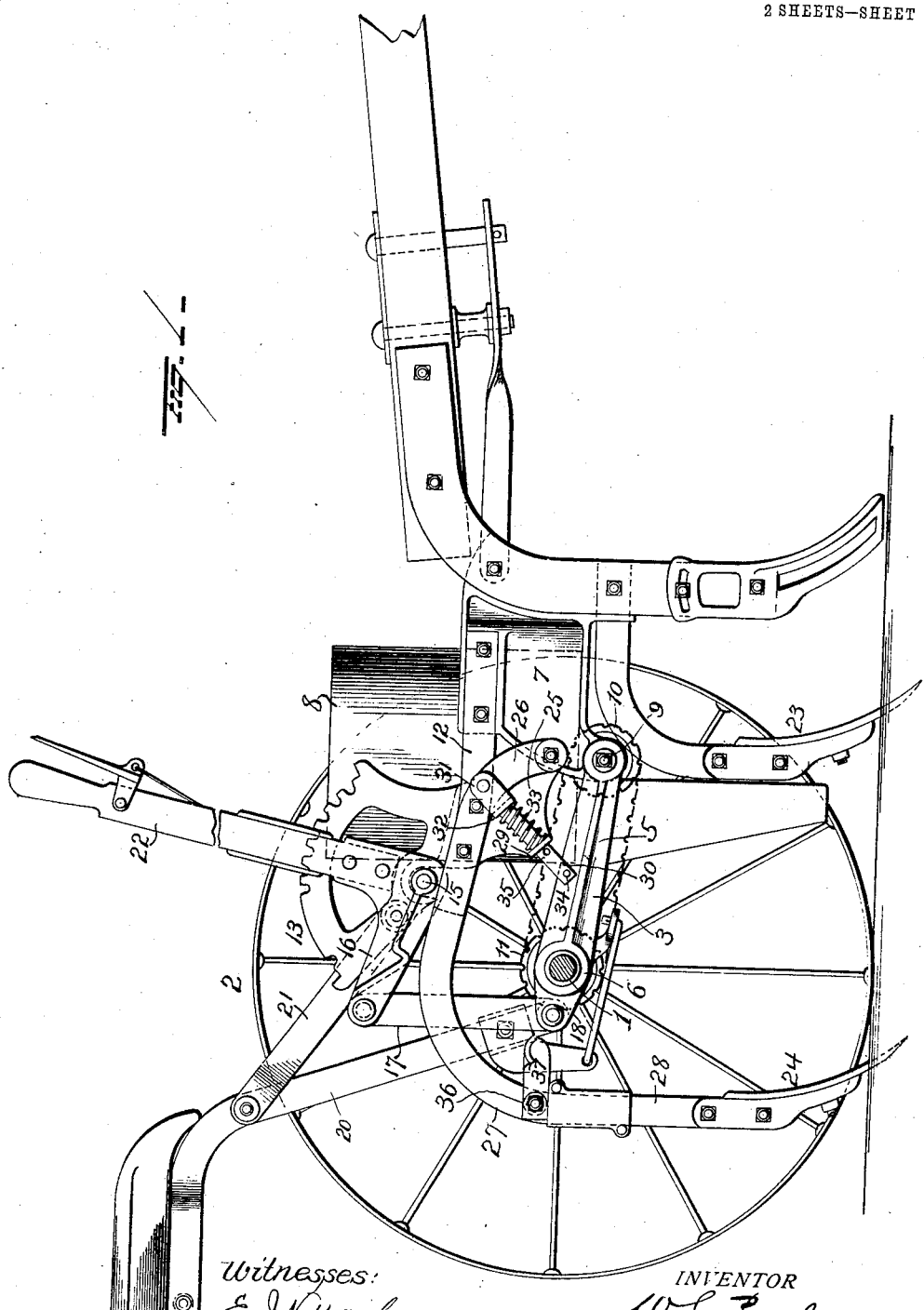

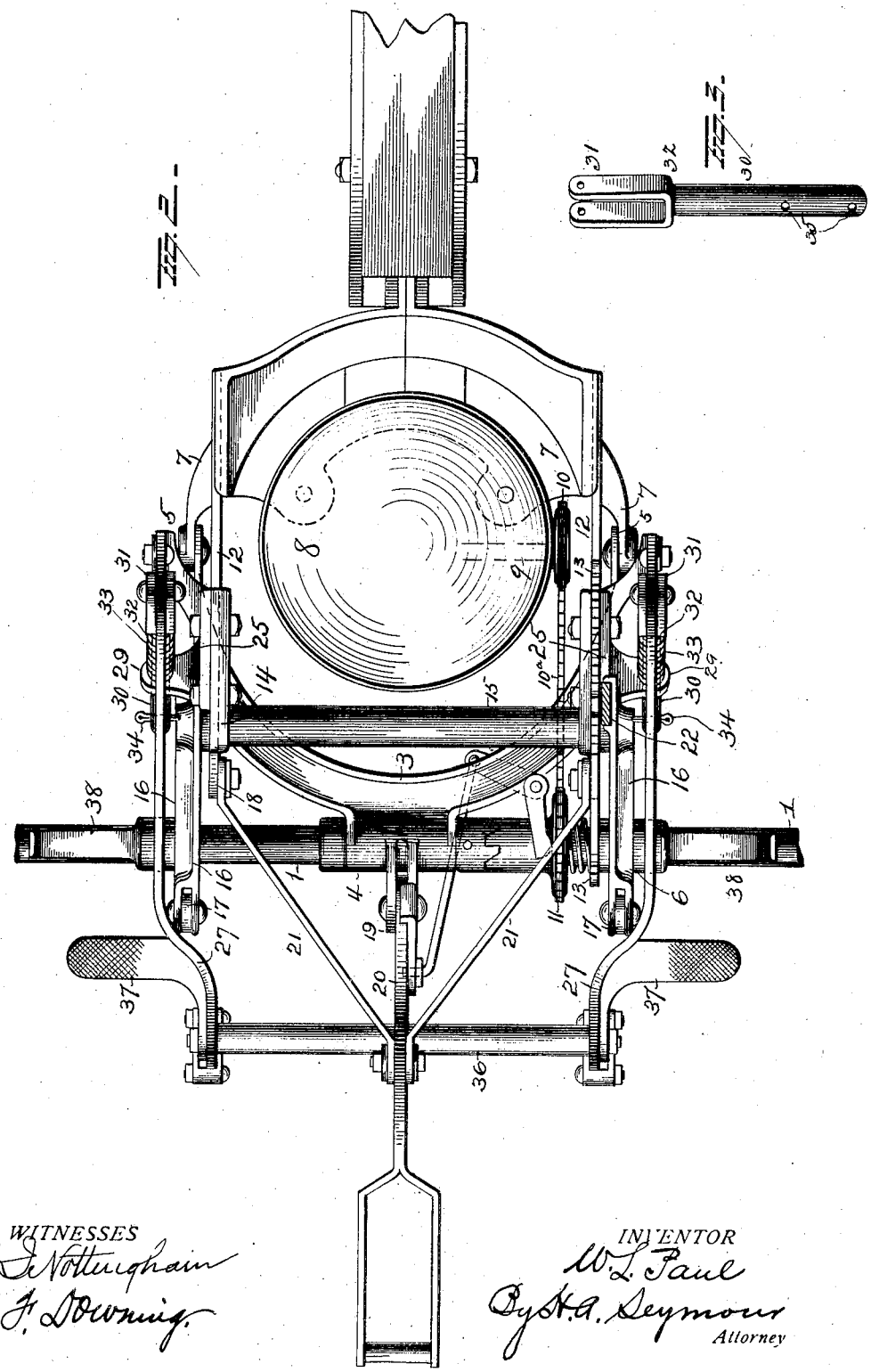

UNITED STATES PATENT OFFICE.

WILLIAM L. PAUL, OF SOUTH BEND, INDIANA, ASSIGNOR TO OLIVER CHILLED PLOW WORKS, OF SOUTH BEND, INDIANA.

PLANTER AND CULTIVATOR.

No. 896,660.      Specification of Letters Patent.      Patented Aug. 18, 1908.

Original application filed June 15, 1907, Serial No. 379,183. Divided and this application filed December 20, 1907. Serial No. 407,373.

*To all whom it may concern:*

Be it known that I, WILLIAM L. PAUL, of South Bend, in the county of St. Joseph and State of Indiana, have invented certain new and useful Improvements in Planters and Cultivators; and I do hereby declare the following to be a full, clear, and exact description of the invention, such as will enable others skilled in the art to which it appertains to make and use the same.

My invention relates to agricultural implements and more particularly to improvements in wheeled machines adaptable for use in planting,—the object of the invention being to provide simple and efficient means to insure uniform covering of seed and to so construct and arrange the covering shovels and their appurtenances that a yielding spring shall be arranged in such manner that considerable travel of the shovels up and down will be effected or permitted with comparatively uniform pressure.

With these and other objects in view the invention consists in certain novel features of construction and combinations of parts as hereinafter set forth and pointed out in the claims.

In the accompanying drawings, Figure 1 is a side elevation of a planter embodying my improvements. Fig. 2 is a plan view of the same. Fig. 3 is a detail view.

1 represents an axle mounted in the hubs of wheels 2. A yoke or frame 3 constituting the rear portion of the framework, is located in front of the axle and provided at its central portion with a sleeve 4 which constitutes a bearing for the axle. The yoke or frame 3 is also provided at its respective sides with arms 5 having collars 6 for the accommodation of the axle. A front frame or yoke 7 is pivotally connected with the rear yoke 3 and on this front yoke or frame a seed box 8 is mounted. The feeding mechanism in the bottom of the seed-box 8 is actuated from a shaft 9 coincident with the pivotal connection between the yokes 3 and 7. This shaft is provided with a sprocket-wheel 10 over which a sprocket chain 10ᵃ passes and the latter receives motion from a sprocket wheel 11 driven from one of the carrying wheels.

Bars 12 are secured at their forward ends to the respective sides of the front yoke 7 and project rearwardly to points approximately over the axle 1,—said bars constituting portions of the forward frame. Upon the rear portion of one of these bars, a toothed segment 13 is secured and upon the other bar 12 a journal box 14 is located. A shaft 15 is mounted in bearings in the frame of the segment 13 and in the journal box 14. Arms 16 project rearwardly from the shaft 15 near respective ends thereof and to the rear ends of these arms, the upper ends of links 17 are pivotally attached. The lower ends of the links 17 are pivoted to portions 18 of the frame or yoke 3,—which portions 18 project rearwardly of the axle 1.

The sleeve 4 of the rear yoke or member 3 is provided with a rearward projection 19, to which the lower end of a seat post 20 is pivotally attached. Brace-bars 21 are connected with the seat-post 20, near the upper end of the latter, and the lower forward ends of these brace-bars are connected, respectively, with the frame of segment 13 and journal-box 14. A lever 22 is provided for turning the shaft 15 and thus imparting motion through the medium of the arms 16 and the links 17 to the rear yoke 3 for turning the latter on its bearing upon the axle and raising or lowering the pivotal point between the yokes or frames 3 and 7 and thus raising or lowering the planting mechanism which is carried by the forward yoke or frame 7, as shown and described in detail in my application for patent filed June 15, 1907, and designated by Serial No. 379,183 and patented January, 21st, 1908, No. 877,116.

A furrow-opening shovel 23 is supported by the front frame or yoke 7 and the covering shovels 24 are also connected with the forward frame in a manner which will now be specifically described.

To each bar 12 of the front frame 7, a bracket 25 is secured and to each of these brackets, at a point over the pivotal connection between the yokes or frames 3 and 7, the depending forward portion 26 of a beam 27 is pivotally attached. The beams 27 project rearwardly over and beyond the axle 1 and terminate in depending standards 28 to which the covering shovels 24 are secured. The lower portion of each bracket 25 is provided, rearwardly of the attachment of the beam 27 thereto, with a perforated lug 29 through which a pin 30 can freely pass. The upper end of each pin 30 is provided with a bifurcated-head 31 which embraces one of the beams 27 and is pivotally connected thereto at a point in proximity to the pivotal connection of said beam with the bracket 25. Each pin 30 is also provided with a shoulder 32 afforded by the head 31 and against this shoulder one end of a spring 33 which encircles the pin, has a bearing,— the other end of said spring engaging the lug 29 of the bracket. Each pin 30 is also provided, near its lower end, with a cotter-pin 34 or other obstructing means, such as a collar, to limit the movement of the pin relatively to the lug 29 on the bracket 25. Each pin 30 is also provided with a hole 35 for the reception of a cotter-pin to prevent upward movement of the beams when desired.

The two beams 27 are connected together preferably at the juncture of the standards 28 thereto, by means of a cross-bar 36 and to this cross-bar foot pieces 37 are secured and disposed in position to receive the heel of an operator and other foot pieces 38 are secured to the rear yoke or frame 3 in position to receive the toe of the operator.

By the construction above described, so-called "floating covering shovels" are provided and it will be observed that by locating the yielding springs near the pivotal points of the beams, considerable travel of the shovels up and down, will be afforded with comparatively uniform pressure. With the use of the two foot pieces 37 and 38, the operator can readily force the shovels down or allow them to rise as desired. In operation the shovels will plow a depth that their adjustment will permit. In case of uneven ground they will rise until the cotter-pin 34 strikes lug 29 or can lower until the springs limit their downward movement. To cause the shovels to go deeper, pressure upon the foot pieces will bring about this result.

Various slight changes might be made in the details of construction of my invention without departing from the spirit thereof or limiting the scope and hence I do not desire to restrict myself to the precise details herein set forth.

Having fully described my invention what I claim as new and desire to secure by Letters-Patent, is,—

1. In a planter, the combination with a frame, of a beam pivotally attached at its forward portion to said frame, a covering shovel carried by said beam, a pin attached to the beam near its pivotal connection with the frame, means for guiding said pin, and a spring bearing against said pin and its guide and imparting a force resulting in an upward tendency of the rear portion of the beam and the shovel carried thereby.

2. In a planter, the combination with a frame, of a beam pivotally attached at its forward end thereto, a covering shovel carried by said beam, a pin attached to the beam near the pivotal connection of the latter with the frame, said pin having a shoulder, a lug through which said pin passes, a spring encircling the pin and bearing against the shoulder thereon and said lug and exerting an upward pressure against said beam near its pivotal support to impart an upward tendency to the shovel at the rear end of the beam, and a stop attached to the pin below said shoulder.

3. In a planter, the combination with a frame, of a beam pivotally connected at its forward end thereto, a covering shovel carried by said beam, a pin provided with a head pivotally attached to the beam near the pivotal point of the latter with the frame, a lug through which said pin passes, a spring encircling the pin and bearing against said lug and the head of the pin said spring tending to press the beam upwardly, a stop on said pin and means for locking the pin to prevent upward movement of the beam.

4. In a planter, the combination with a frame, of a bracket secured thereto, a beam pivotally connected at its forward end to said bracket, a covering shovel carried by said beam, a lug projecting laterally from the bracket, a pin passing through said lug and provided with a head pivoted to said beam, and a spring located on the pin between the head thereof and the lug on the bracket and exerting an upward pressure against the beam near its pivotal connection with the bracket to impart an upward tendency to the covering shovel.

5. In a planter, the combination with a frame, of two beams pivotally attached at their forward ends to said frame, a member connecting the rear portions of said beams, spring sustaining means for said beams located in proximity to the pivotal points thereof, and foot rests at respective ends of said connecting member.

6. In a planter, the combination with a frame, of a beam pivoted at its forward end thereto, a shovel carried by said beam, a foot piece rigid with said beam and spring-sustaining means for said beam connected with the latter in proximity to the pivotal support thereof.

7. In a planter, the combination with an axle mounted on wheels, a rear frame or yoke mounted on the axle, and a front frame or yoke pivotally connected with the rear frame or yoke, of beams pivotally connected at their forward portions with the front frame, covering shovels carried by said beams, and springs exerting force near the pivotal points of the beams to effect upward tendency of the rear portions of the beams.

8. In a planter, the combination of an axle mounted on wheels, a rear frame mounted on the axle, a front frame pivoted to the rear frame, planting devices carried by the front frame, beams pivotally attached at their forward ends to the front frame and provided at their rear ends behind the axle with standards having covering shovels, springs exerting a force near the pivotal supports of the beams to impart an upward tendency to said beams, a foot piece connected with said beams and a foot piece on the rear frame.

In testimony whereof, I have signed this specification in the presence of two subscribing witnesses.

WILLIAM L. PAUL.

Witnesses:
    FRANCIS C. NIPPOLD,
    EDWIN NICAR.